United States Patent [19]

Miyamori

[11] Patent Number: 5,436,838

[45] Date of Patent: Jul. 25, 1995

[54] CRASH/NON-CRASH DISCRIMINATION USING FREQUENCY COMPONENTS OF ACCELERATION UNIQUELY GENERATED UPON CRASH IMPACT

[75] Inventor: Masahiro Miyamori, Osaka, Japan

[73] Assignee: NEC Corporation, Tokyo, Japan

[21] Appl. No.: 124,229

[22] Filed: Sep. 21, 1993

[30] Foreign Application Priority Data

| Sep. 21, 1992 | [JP] | Japan | 4-250914 |
| Nov. 25, 1992 | [JP] | Japan | 4-315348 |
| May 17, 1993 | [JP] | Japan | 5-114780 |

[51] Int. Cl.⁶ .................................................. B60R 21/32
[52] U.S. Cl. .................... 364/424.05; 180/282; 340/436; 280/735
[58] Field of Search ........... 364/424.01, 424.03, 364/424.04, 424.05; 180/282; 280/735, 734; 307/10.1; 340/436

[56] References Cited

U.S. PATENT DOCUMENTS

| 5,036,467 | 7/1991 | Blackburn et al. | 364/424.05 |
| 5,065,322 | 11/1991 | Mazur et al. | 364/424.05 |
| 5,067,745 | 11/1991 | Yoshikawa | 280/735 |
| 5,073,860 | 12/1991 | Blackburn et al. | 364/424.05 |
| 5,081,587 | 1/1992 | Okano | 364/424.05 |
| 5,109,341 | 4/1992 | Blackburn et al. | 364/424.05 |
| 5,164,901 | 11/1992 | Blackburn et al. | 364/424.05 |
| 5,182,459 | 1/1993 | Okano et al. | 307/10.1 |
| 5,189,311 | 2/1993 | Moriyama et al. | 307/10.1 |
| 5,216,607 | 6/1993 | Diller et al. | 364/424.05 |
| 5,229,943 | 7/1993 | Eigler et al. | 364/424.05 |

FOREIGN PATENT DOCUMENTS

| 4117811 | 12/1992 | Germany . |
| 90/09298 | 8/1990 | WIPO . |

Primary Examiner—Kevin J. Teska
Assistant Examiner—Russell W. Frejd
Attorney, Agent, or Firm—Sughrue, Mion, Zinn, Macpeak & Seas

[57] ABSTRACT

In a crash detection apparatus, the output signal of an accelerometer is integrated at intervals and a velocity signal is produced. Those frequency components of the accelerometer output which appear uniquely during a vehicle crash are extracted and their amplitude is squared to produce an impact energy signal. An airbag is operated when the velocity signal exceeds a first threshold, or when a sum of the velocity and impact energy signals exceeds a second threshold, or operated when the impact energy signal exceeds a third threshold. In a modified embodiment, the accelerometer output is integrated both at longer and shorter intervals to produce a long-term and a short-term velocity signal. The airbag is operated when the long-term velocity signal exceeds a first threshold, or when the short-term velocity signal and the impact energy signal simultaneously exceed a second and a third threshold, respectively.

15 Claims, 8 Drawing Sheets

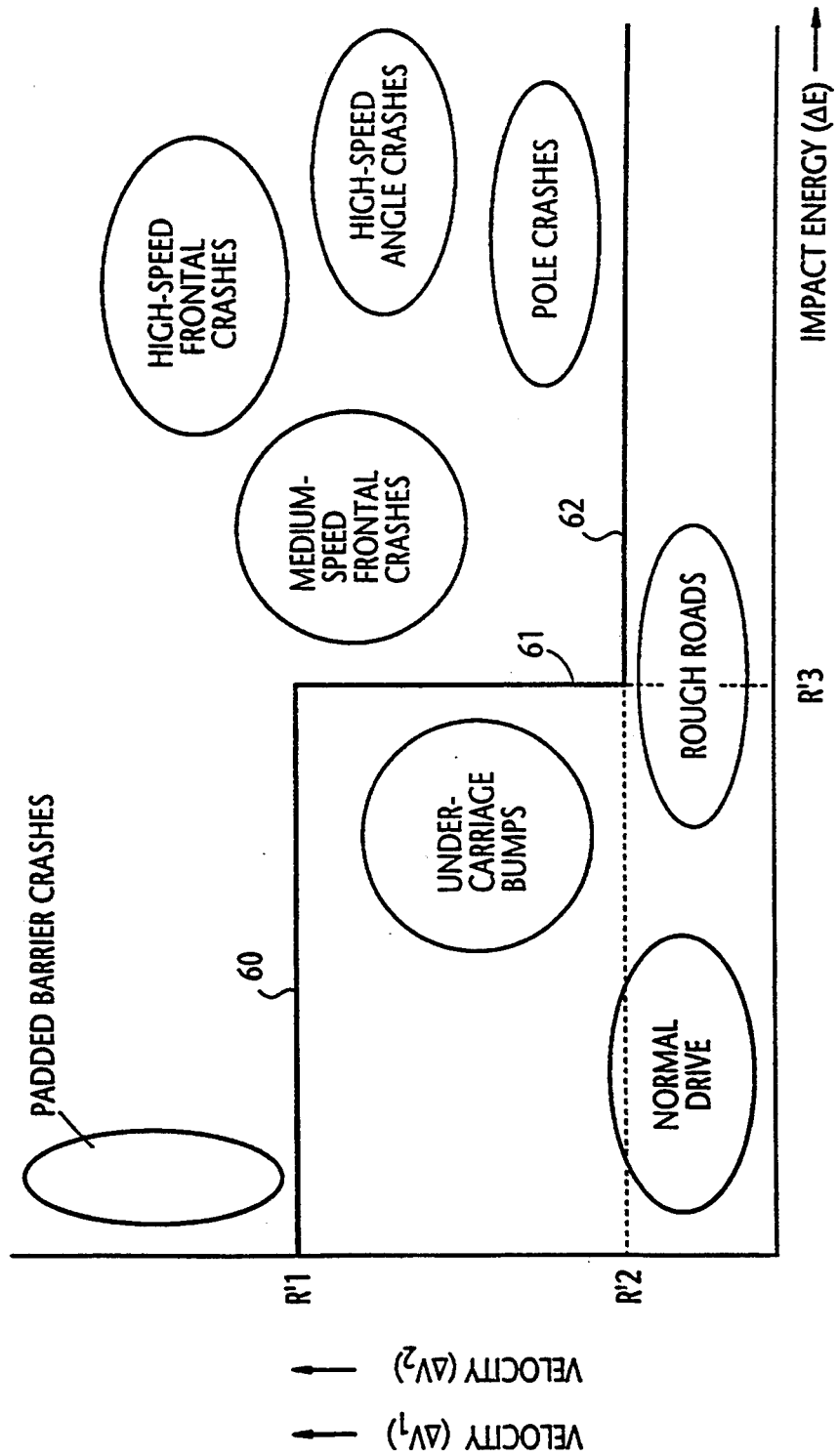

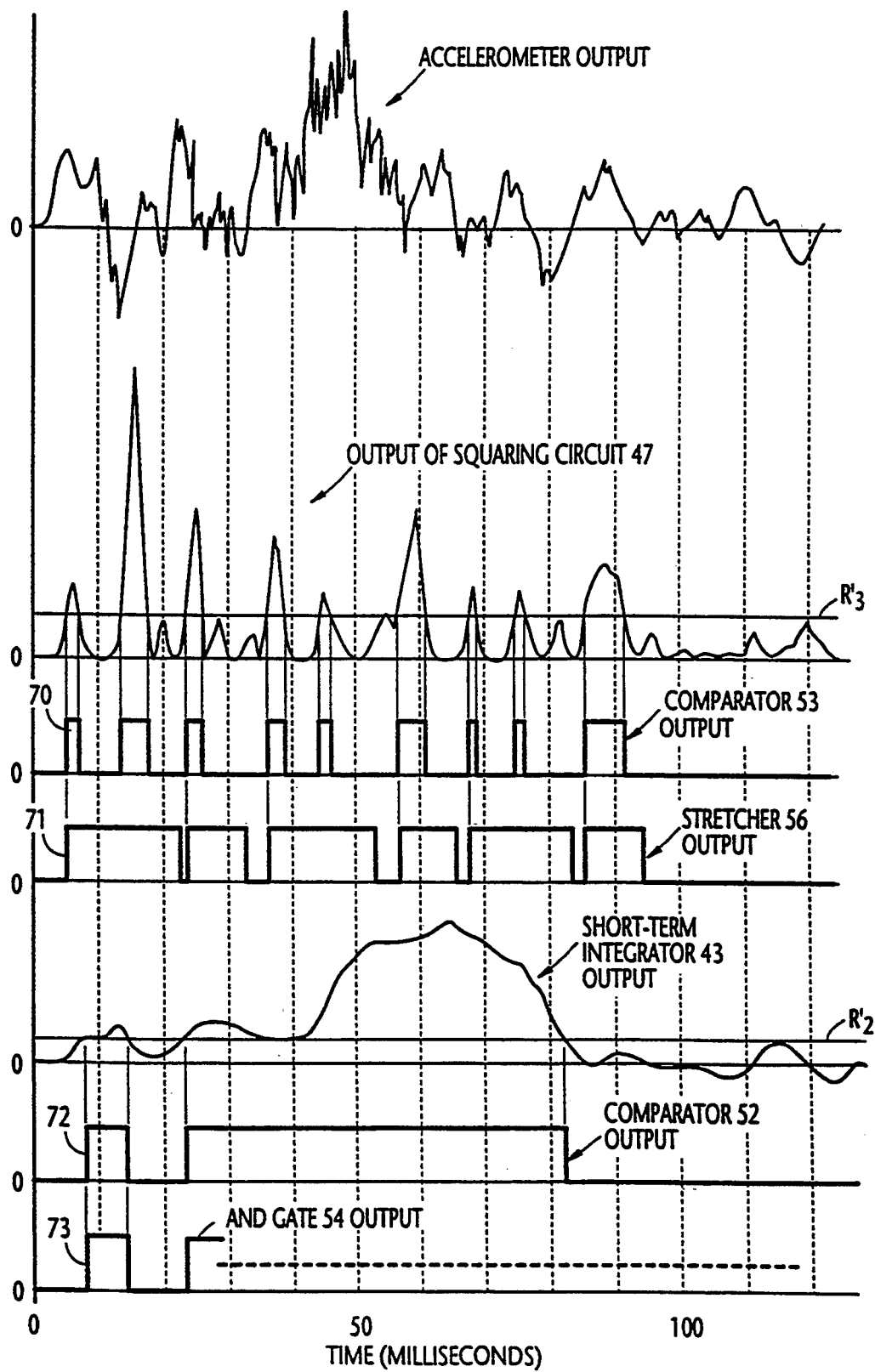

CRASH/NON-CRASH DISCRIMINATION USING FREQUENCY COMPONENTS OF ACCELERATION UNIQUELY GENERATED UPON CRASH IMPACT

BACKGROUND OF THE INVENTION

1. Field of the Invention

The present invention relates to a vehicle crash detection apparatus for an Inflatable occupant restraint system.

2. Description of the Related Art

A conventional crash detection apparatus for an inflatable occupant restraint system, or "airbags", makes use of an accelerometer and an offset integrator. The accelerometer generates upon crash impact a signal representative of the vehicle acceleration/deceleration, while the offset integrator subtracts the maximum acceleration value that is encountered during normal drive from the output of the accelerometer and integrates the subtracted acceleration signal over a preset time interval. The integrated signal is then compared with a threshold value and when the threshold is exceeded the restraint system Is operated. Since the airbag must be fully deployed before the occupant is tilted 12.5 centimeters forwards when the vehicle crashes at a medium speed, and the airbag deployment time is approximately 30 milliseconds, there is a small amount of time left for the crash detection apparatus to make a crash/non-crash discrimination.

While the prior art crash detection apparatus is useful for crash events where a sharp vehicle speed variation occurs upon impact, it fails to make a correct discrimination between rough roads and pole crashes where the initial impact on the vehicle is rather small.

SUMMARY OF THE INVENTION

It is therefore an object of the present invention to provide precision vehicle crash detection capable of making a reliable discrimination between crash and noncrash events which are currently indistinguishable.

The object of the present invention is obtained by extracting those frequency components of the output of the accelerometer which occur uniquely during a vehicle crash and using the extracted frequency components as a derision making factor.

According to a first aspect of the present invention, the output signal from an accelerometer is integrated at Intervals to derive a velocity signal. Those frequency components of the accelerometer signal which appear uniquely during the vehicle crash are extracted and the amplitude of the extracted components is squared to produce an impact energy signal. A decision is made on the velocity signal and the impact energy signal, and according to this decision, the occupant restraint system is operated. Preferably, the velocity signal is compared with a first threshold value and when it exceeds the first threshold value, the restraint system is operated. A sum of the velocity signal and the impact energy signal is produced and compared with a second threshold value, and the impact energy signal is compared with a third threshold value. The restraint system is operated when the sum exceeds the second threshold value or when the impact energy signal exceeds the third threshold value.

According to a second aspect of the present invention, the accelerometer signal at longer intervals to produce a long-term velocity signal and at shorter intervals to produce a short-term velocity signal. Frequency components of the accelerometer signal which appear uniquely during the vehicle crash are extracted and the amplitude of the extracted components is squared to produce an impact energy signal. A decision is made on the long-term and short-term velocity signals and the impact energy signal, and the occupant restraint system is operated in accordance with the decision. Preferably, the long-term velocity signal is compared with a first threshold value and when it exceeds the first threshold value, the restraint system is operated. The short-term velocity signal and the impact energy signal are compared with a second and a third threshold value, respectively. The restraint system is operated when both of the short-term velocity signal and impact energy signal simultaneously exceed their respective threshold values.

BRIEF DESCRIPTION OF THE DRAWINGS

The present invention will be described in further detail with reference to the accompanying drawings, in which:

FIG. 8 is a crash/non-crash discrimination map associated with the embodiment of FIG. 7; and FIG. 9 is a waveform diagram showing various waveforms appearing In FIG. 7 during a frontal crash.

DETAILED DESCRIPTION

Figure 1:
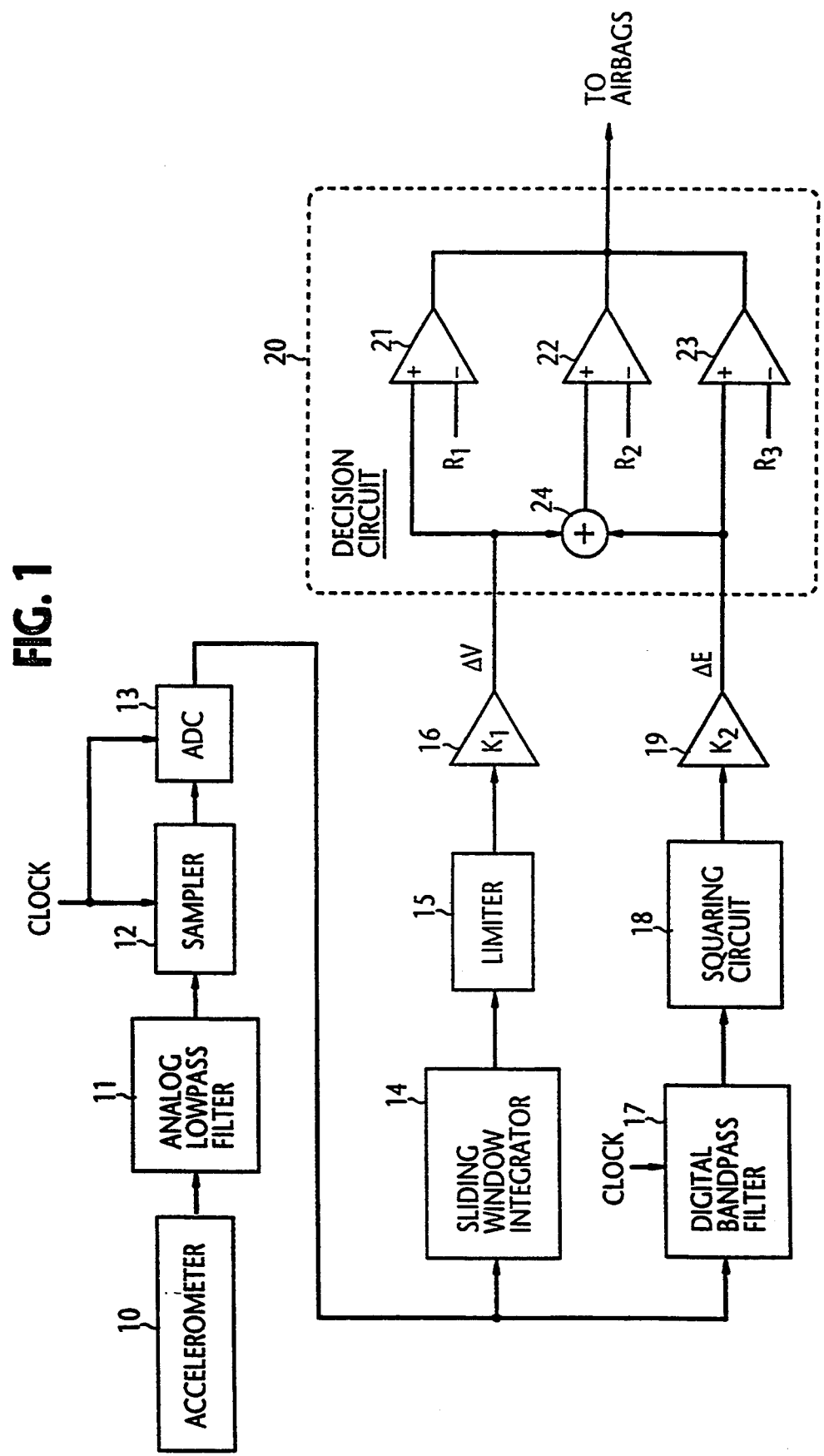
FIG. 1 is a block diagram of a crash detection circuit according to one embodiment of the present invention.

Referring now to FIG. 1, there is shown a crash detection circuit of the present invention mounted in a vehicle for operating an inflatable restraint system, or what is called "airbags", when the vehicle encounters a crash. The crash detection circuit includes a semiconductor accelerometer 10 which consists of a strain gauge secured on a semiconductor substrate and makes use of the piezoelectric effect of the semiconductor to produce an accelerometer signal representative of the acceleration/deceleration of the vehicle when it is mechanically deformed upon the application of an impact force.

To allow digital processing of the accelerometer signal without foldover (aliasing) distortion, an analog lowpass filter 11 is connected to the accelerometer 10 to cut off the frequency components of the accelerometer signal higher than twice the sampling frequency at which it is sampled and processed by subsequent processing circuitry. The lowpass-filtered signal is applied to a sampler 12 where it is sampled at, say, 1-ms intervals End fed into an analog-to-digital converter 13 where the sampled values are converted to a digitized signal.

The digitized accelerometer signal is applied to a sliding window integrator 14 where digital samples are stored and a predetermined number of samples In a successive window of 90 milliseconds are integrated to produce a signal representative of the instantaneous velocity of the vehicle. The integration is repeated at 90-ms intervals to update the velocity value. It is found that under certain conditions vehicle deceleration continues excessively after the instant of crash, and the accelerometer signal becomes rich with low frequency components, producing a large negative integration value. Since the excessive negative value of the integrator would cause a delay in making a crash/non-crash decision, a limiter 15 is connected to the output of integrator 14 to prevent the velocity signal from going negative below a certain critical value. The output of limiter 15 is multiplied by a coefficient $K_1$ in a multiplier 16 to produce a velocity parameter $K_1 \Delta V$.

Vehicle crash can be considered as a plastic deformation of a composite of numerous resilient materials upon the application of impact. It is found that the deceleration signal contains unique frequency components when a vehicle experiences a crash. The frequency distribution of the deceleration signal that markedly shows a crash event varies depending on the type of vehicles. According to the present invention, among the various waveforms that are superimposed on a first quarter wavelength of the fundamental frequency of the sinusoidal deceleration waveform generated upon impact those frequency components having characteristic waveform fluctuations are extracted. These frequency components are considered to arise from different structural components of the vehicle as they are broken, bent and sheared upon crash impact. Typically, the characteristic frequency components are extracted from the range between 20 Hz and 200 Hz. For this purpose, the output of A/D converter 13 is applied to a bandpass filter 17 where the characteristic frequency components are extracted. The present invention evaluates the amount of a crash impact from the extracted frequency components.

Figures 2, 3:
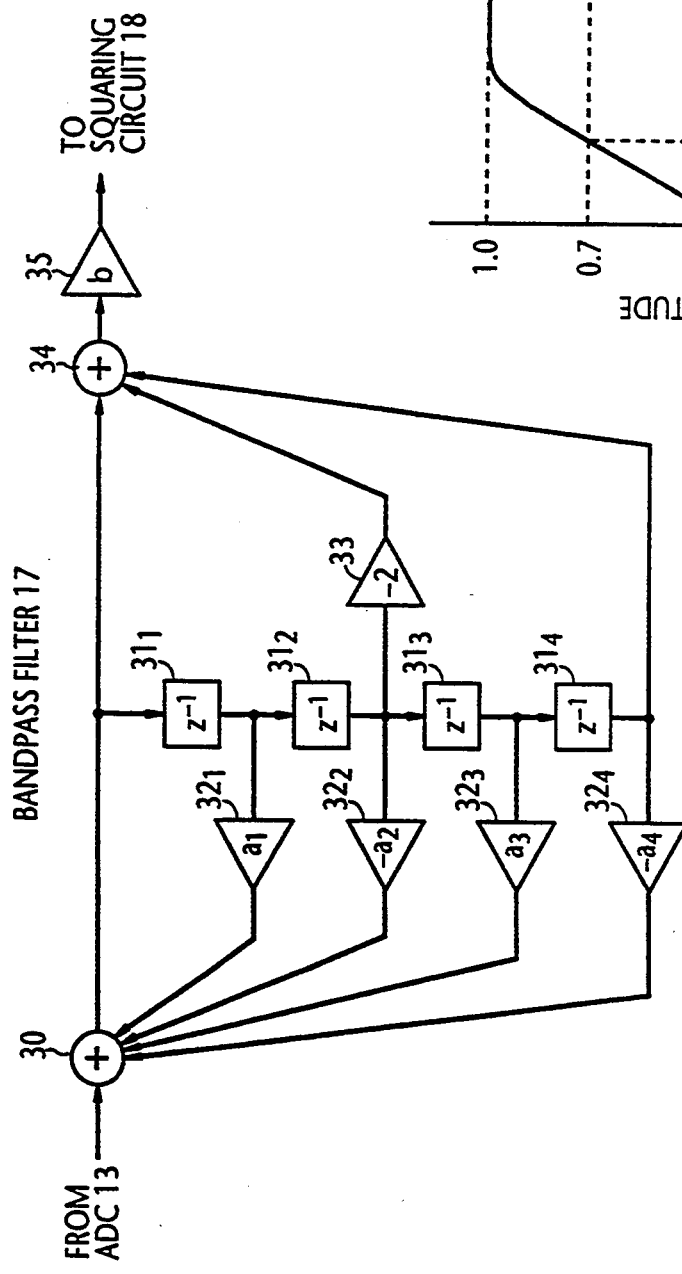
FIG. 2 is a block diagram of the bandpass filter of FIG. 1.
FIG. 3 is a graphic representation of the frequency response of the bandpass filter.

As shown in detail in FIG. 2, the bandpass filter 17 includes a first adder 30 to which the output of A/D converter 13 is applied. A tapped delay fine comprising a series of one-sample delay elements, or delay-line taps $31_1 \sim 31_4$ is connected to the output of adder 30 to produce a succession of tap signals. Coefficient multipliers $32_1 \sim 32_4$ are connected respectively to the outputs of delay-line taps $31_1 \sim 31_4$ for weighting the tap signals with tap-weight coefficients $a_1$, $-a_2$, $a_3$ and $-a_4$. The weighted tap signals are summed in adder 30 with the output of A/D converter 13. The output of the first adder 30 is applied recursively to the tapped delay line and to a second adder 34. A coefficient multiplier 33 is connected to the output of delay-line tap 312 to multiply the tap signal from delay unit $31^z$ by "$-2$" and applied to adder 34 to which the output of delay-line tap $31_4$ is also applied. The output of adder 34 is multiplied by a coefficient "b" in a multiplier 35 for delivery to a later stage. The transfer function H(z) of the bandpass filter 17 is given by:

$$H(z) = b(1-z^{-2})^2/(1-a_1 z^{-1} + a_2 z^{-2} - a_3 z^{-3} + a_4 z^{-4})$$

By choosing the tap-weight coefficients and the coefficient "b" as $a_1 = 2.2979$, $a_2 = 1.9649$, $a_3 = 0.8732$, $a_4 = 0.2194$, and $b = 0.7012$, the bandpass filter 17 has a passband of 20 Hz to 200 Hz as shown in FIG. 3.

Since the vehicle speed, upon impact, decays following a cosine curve, the impact energy of the vehicle during the zero- and 90-degree phase angles of the cosine curve can be approximated as being equal to the square value of the vehicle's speed variations. For this reason, the amplitude of the frequency components extracted by the bandpass filter 17 is squared in a squaring circuit 18 to produce a signal $\Delta E$ representative of the impact energy regardless of the polarities of the deceleration signal. The impact energy signal is then weighted by a coefficient $K_2$ in a multiplier 19 to produce an impact parameter $\Delta E$.

Figure 4:
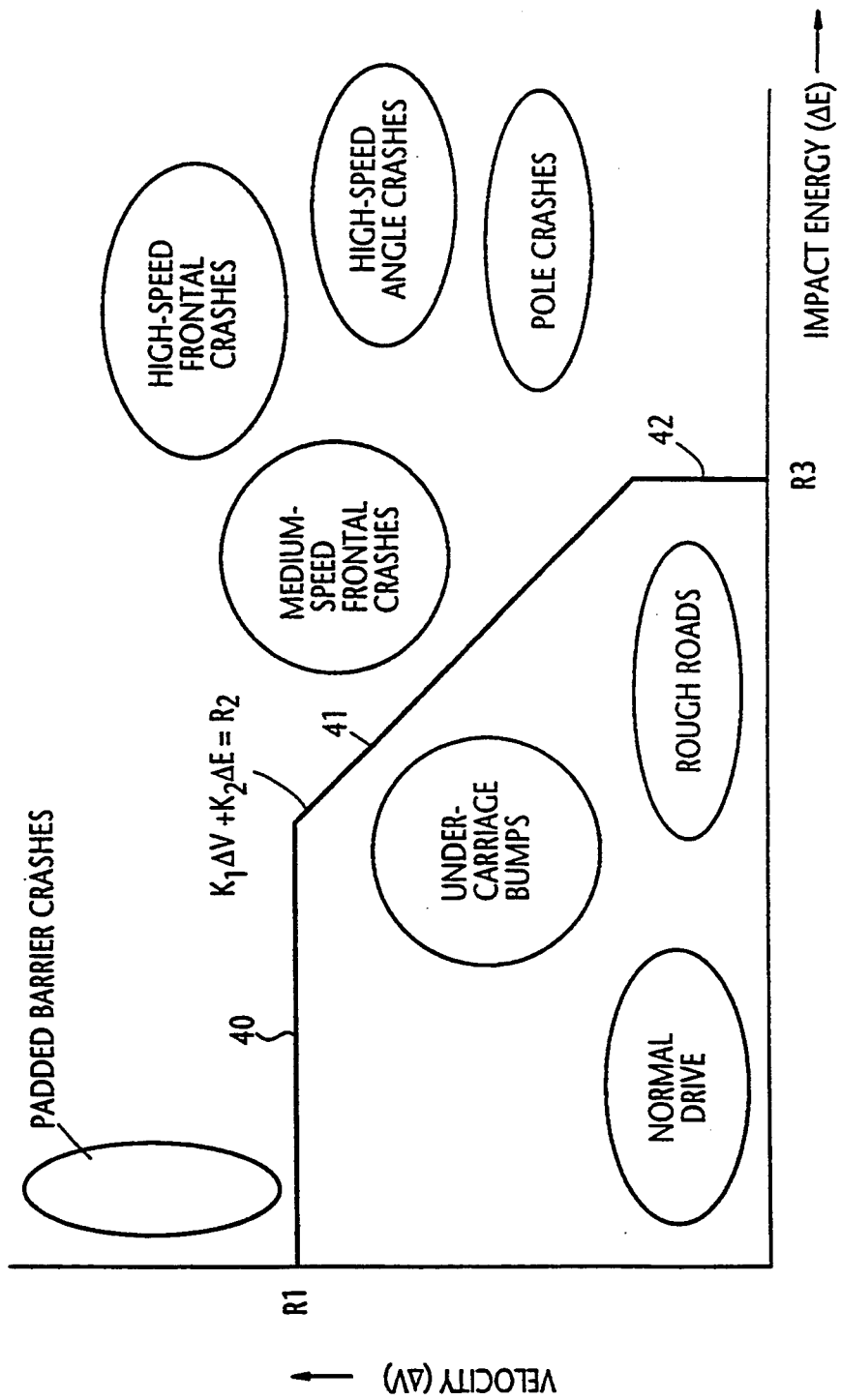
FIG. 4 is a crash/non-crash discrimination map associated with the embodiment of FIG. 1.

The instantaneous speed parameter $\Delta V$ and impact parameter $\Delta E$ are supplied to a deployment decision circuit 20 for supplying a deployment signal to the airbags, not shown, in accordance with decision thresholds indicated in a crash discrimination map (FIG. 4) in which vehicle velocity $\Delta V$ is plotted as a function of impact energy $\Delta E$. In FIG. 4, different types of vehicle crash events and non-crash events are indicated in the shape of circles and ellipsis. The velocity and impact energy values falling within the boundary of any of these regions are those actually obtained by experiments at 30-ms after the instant of crash/non-crash event. A line 40 defines a first threshold $R_1$ and is drawn between padded barrier crashes (in which the vehicle crashes with a barrier padded with shock absorbing material) and under-carriage bumps. A line 41 defines a second threshold $R_2$ which is equal to the relation $K_1 \Delta V + K_2 \Delta E$ drawn between frontal crash events and under-carriage bumps. Finally, a line 42 defines a third threshold $R_3$ that separates pole crash events and rough roads. The decision circuit 20 produces a deployment signal when either of these thresholds is exceeded. Specifically, It includes comparators 21, 22 and 23 and an adder 24. Comparator 21 compares the velocity parameter $K_1 \Delta V$ with a reference voltage representing the first threshold $R_1$ and produces a deployment signal when the velocity parameter exceeds the reference voltage. This occurs when the vehicle experiences a padded barrier crash. The velocity parameter $K_1 \Delta V$ and impact energy parameter $K_2 \Delta E$ are summed together by the adder 24 and compared by comparator 22 with a reference voltage representing the second threshold $R_2$ to produce a deployment signal when the summed value exceeds the reference in a frontal crash event. Comparator 23 makes comparison between the impact energy $K_2 \Delta E$ and a reference voltage representing the third threshold $R_3$ and produces a deployment signal when the reference voltage is exceeded as the vehicle experiences a pole crash.

Figure 5:
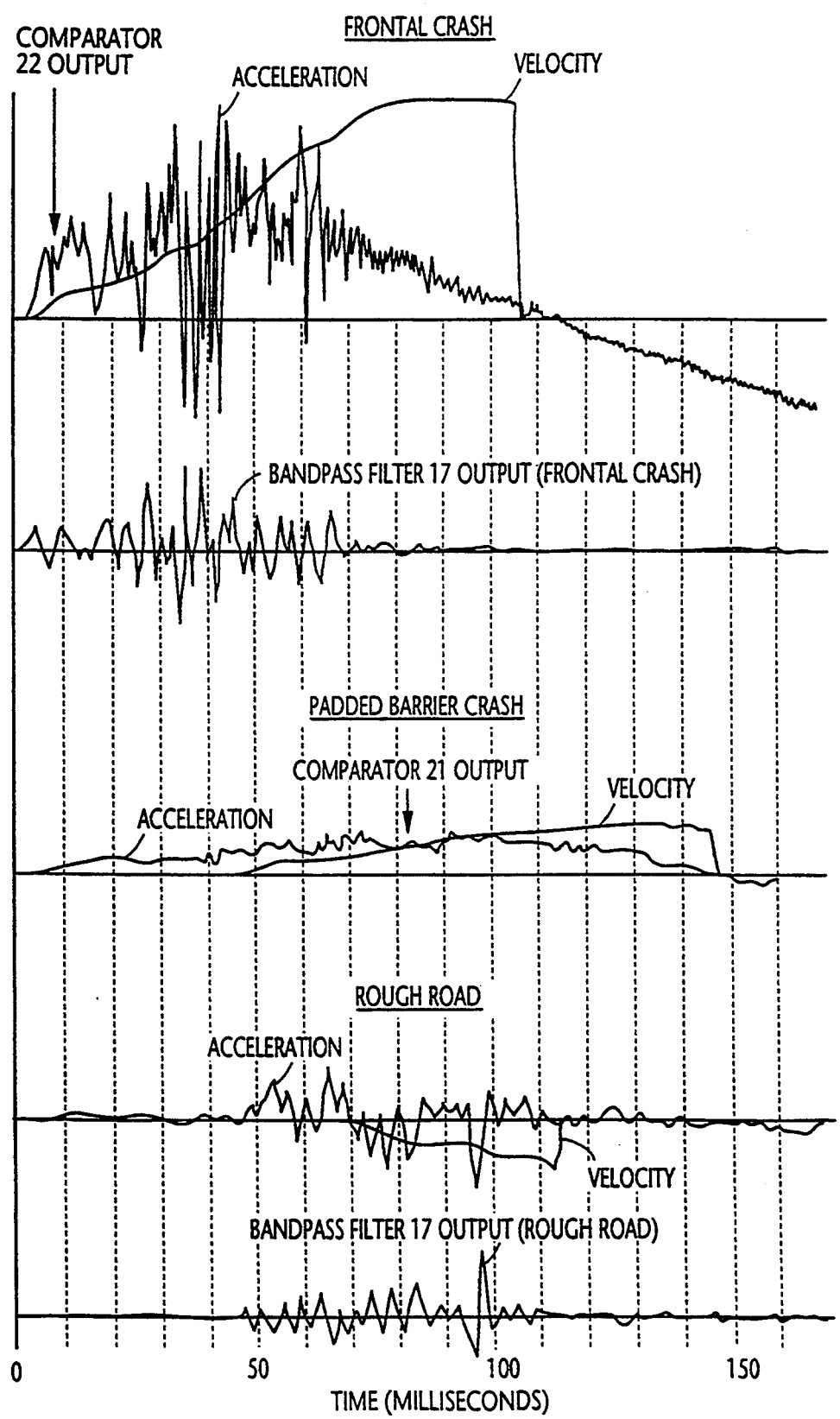
FIG. 5 is a waveform diagram showing various waveforms appearing in FIG. 1 during frontal crash, padded barrier crash and rough road drive.

In the case of a frontal crash at 50 kilometer per hour (FIG. 5), both acceleration (G) and velocity ($\Delta V$) rapidly rise on impact, and the sum of impact energy and velocity exceeds the threshold value $R_2$ of comparator 22 within 10 milliseconds from the start of crash. In the case of a padded barrier crash at 30 kmph, the velocity ($\Delta V$) exceeds the threshold $R_1$ of comparator 21 at about 80 milliseconds from the start of the crash. During a rough road drive, the velocity parameter is lower than threshold $R_1$ and the bandpass filter 17 produces a sharply rising output, but its amplitude is lower than threshold $R_3$. With prior art techniques, false decisions are often made In discriminating a rough road event from a pole crash event. Since the decision threshold $R_3$ of pole crash events is set higher than any of impact energies which might be produced on rough roads, no false deployment signal is generated by the crash detector of the present invention in any rough road conditions. In the case of pole crashes, the impact energy exceeds threshold while the velocity is lower than threshold $R_1$ and the combined value of the velocity and the impact energy is also lower than threshold $R_2$.

Figure 6:
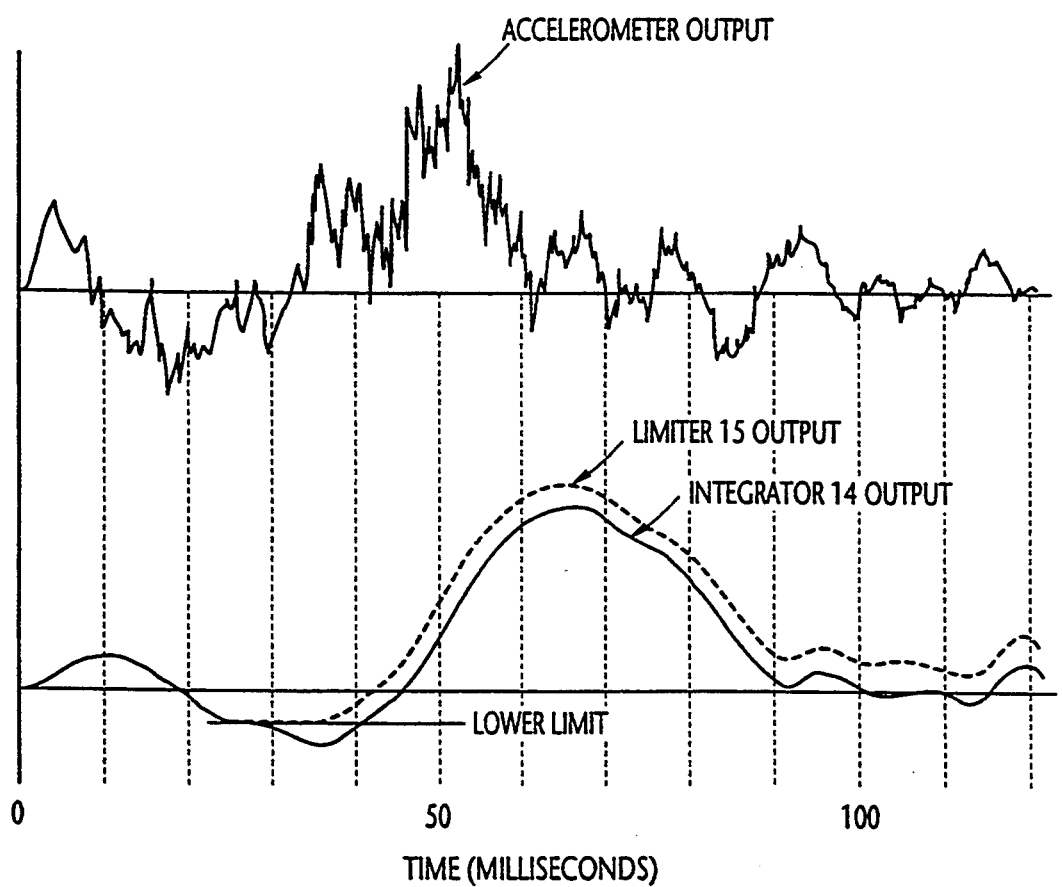
FIG. 6 Is a waveform diagram showing waveforms of the accelerometer, integrator and limiter in the case of an angle crash.

As illustrated In FIG. 6, the use of the limiter 15 is particularly useful for crash events where the velocity signal tends to go negative for an extended period of time and would otherwise cause decision delays. The output of limiter 15 goes positive earlier as indicated by broken lines than the output of integrator 14 does, contributing to the increases in the signal components which are significant for deployment decision.

Figure 7:
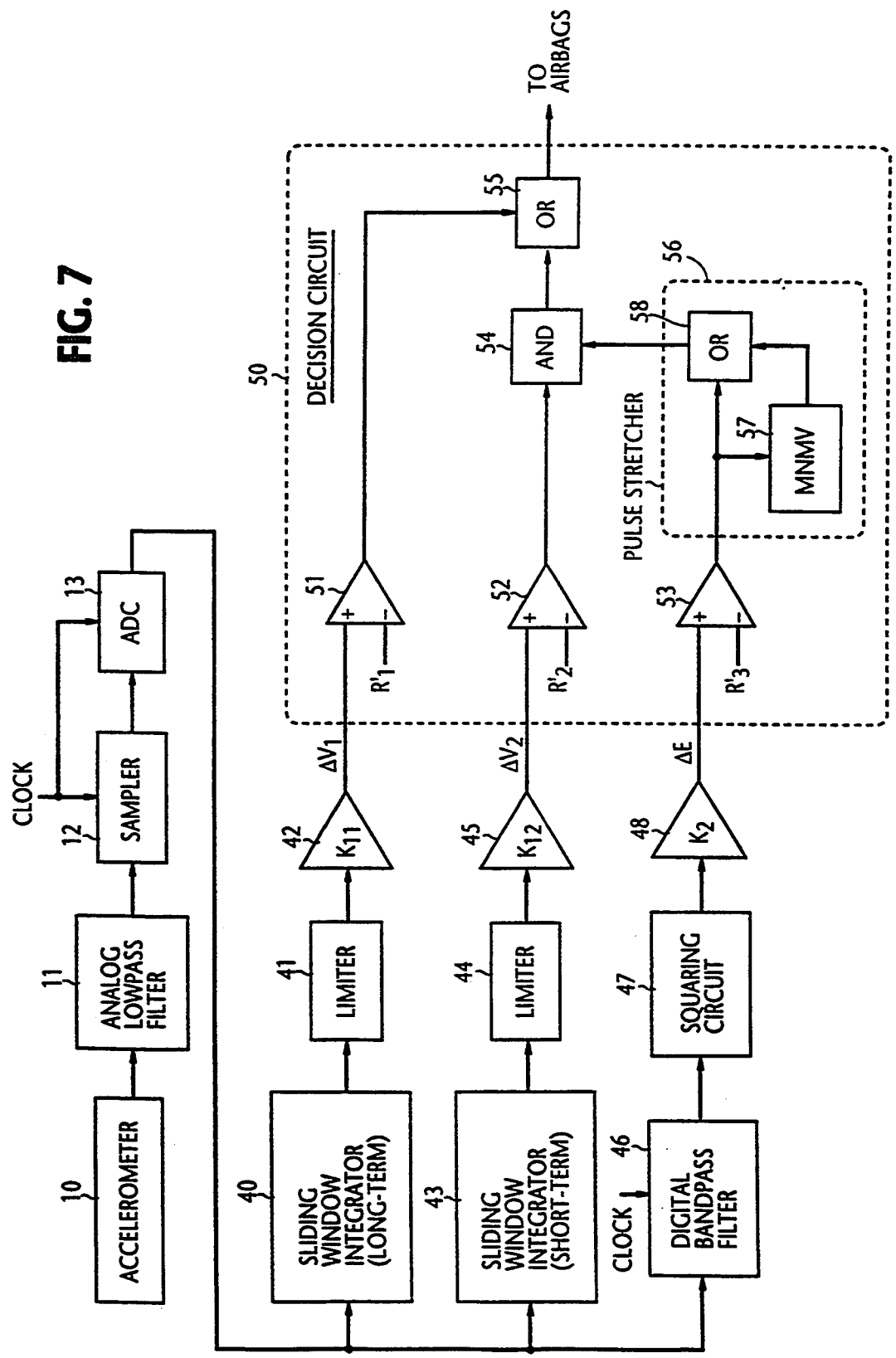
FIG. 7 is block diagram of a crash detection circuit according to a modified embodiment of the present invention.

The present invention is modified as shown in FIG. 7 which employs different decision thresholds from those used in the previous embodiment. Similar to the previous embodiment, the modified crash detection circuit comprises a 90-ms (long-term) sliding window integrator 40, a limiter 41 and a multiply-by-$K_{11}$ multiplier 42 to produce a long-term velocity signal $\Delta V_1$, and digital bandpass filter 445, squaring circuit 47 and multiply-by-$K_2$ multiplier 48 to produce an impact energy signal $\Delta E$. Similar to the previous embodiment, long-term integrator 40 provides integration of the output of A/D converter 13 at 90-ms intervals and limiter 41 has the same lower critical value as limiter 15. The modified embodiment differs from the previous embodiment by the inclusion of a short-term sliding window integrator 43, a limiter 44 and a multiply-by-$K_{12}$ multiplier 45 to produce a velocity signal $\Delta V_2$. The short-term integrator 43 provides integration of the output of A/D converter 13 at 30-ms ms intervals. The lower critical value of limiter 44 is slightly higher than that of limiter 41. The velocity signals $\Delta V_1$, $\Delta V_2$ and impact energy signal $\Delta E$ are supplied to a deployment decision circuit 50 which makes a deployment decision according to a decision map shown in FIG. 8.

As illustrated in FIG. 8, a line 60 defines a first threshold $R_1$ and is drawn between padded barrier crashes and under-carriage bumps. A horizontal line 62 corresponds to a second threshold $R'_2$ and is drawn between frontal crash events and rough roads. Finally, a line 61 defines a third threshold $R'_3$ that separates pole crash events and rough roads.

Returning to FIG. 7, the decision circuit 50 includes comparators 51, 52 and 53. Comparator 51 makes a comparison between the velocity signal $\Delta V_1$ and a reference voltage corresponding to the first threshold $R'_1$ and produces a deployment signal if the latter is exceeded. The output of comparator 51 is passed through an OR gate 55 to the airbags. Comparator 52 compares the velocity signal $\Delta V_2$ with a reference voltage corresponding to the second threshold $R'_2$ and produces a deployment signal if the latter Is exceeded. Comparator 53 compares the impact energy signal $\Delta E$ with a reference voltage corresponding to the third threshold $R'_3$ and produces a deployment signal if the latter is exceeded when a padded barrier crash occurs. The output of comparator 53 is applied to a pulse stretcher 56 where the it is stretched in duration by a monostable multivibrator 57. An OR gate 58 is connected to the outputs of both comparator 53 and monostable multivibrator 57 so that the output of OR gate 58 goes high in quick response to the output signal of the comparator 53. The outputs of comparator 52 and OR gate 58 are combined by an AND gate 54 whose output is coupled to OR gate 55. AND gate 54 thus produces a deployment signal when the short-term velocity signal $\Delta V_2$ and the impact energy signal $\Delta E$ are time coincident with each other. Such coincidences occur when the vehicle experiences a frontal crash or a pole crash.

The waveforms of signals generated at various points of the embodiment of FIG. 7 in a frontal crash at 50 kmph are shown in FIG. 9. The output of squaring circuit 47 exceeds the threshold $R'_3$ within the period of 10 milliseconds from the beginning of the crash, causing comparator 53 to produce an output pulse 70, which Is stretched by pulse stretcher 56 into a pulse 71. Immediately following the leading 28 edge of the pulse 71, the output of short-term Integrator 43 exceeds the threshold $R'_2$ and comparator 52 produces an output pulse 72 which coincides with the pulse 71, producing a deployment pulse 73 at the output of AND gate 54.

The foregoing description shows only preferred embodiments of the present invention. Various modifications are apparent to those skilled in the art without departing from the scope of the present invention which is only limited by the appended claims. For example, the digital circuitry connected to the output of A/D converter 13 can be implemented with a digital signal processor. Therefore, the embodiments shown and described are only illustrative, not restrictive.

What is claimed is:

1. A crash detection apparatus for operating an inflatable occupant restraint system, comprising:
   an accelerometer for producing an accelerometer signal representative of acceleration/deceleration of the vehicle during a vehicle crash;
   Integrator means for integrating said accelerometer signal at intervals and producing a velocity signal;
   bandpass filter means for detecting frequency components of said accelerometer signal which appear uniquely during said vehicle crash;
   squaring means for squaring the amplitude of the bandpass filtered accelerometer signal and producing an impact energy signal; and
   decision means for producing a deployment signal in accordance with said velocity signal and said impact energy signal and applying said deployment signal to said occupant restraint system, 2. A crash detection apparatus as claimed in claim 1, wherein said decision means comprises;
   first comparator means for comparing said velocity signal with a first threshold value and producing a first deployment signal when said velocity signal exceeds said first threshold value;
   adder means for summing said velocity signal and said impact energy signal;
   second comparator means for comparing the output of the adder means with a second threshold value and applying a second deployment signal to said restraint system when said output signal of the adder means exceeds said second threshold value; and
   third comparator means for comparing said impact energy signal with a third threshold value and applying a third deployment signal to said restraint system when said impact energy signal exceeds said third threshold value.

3. A crash detection apparatus as claimed in claim 1, further comprising limiter means for preventing the output signal of said integrator means from reducing below a predetermined negative level.

4. A crash detection apparatus as claimed in claim 1, further comprising:
   first weighting means for weighting said velocity signal to produce a weighted velocity signal and applying the weighted velocity signal to said decision means; and
   second weighting means for weighting the impact energy signal to produce a weighted impact energy signal and applying the weighted impact energy signal to said decision means,
   said decision means producing said deployment signal in accordance with the weighted velocity signal and the weighted impact energy signal.

5. A crash detection apparatus for operating an inflatable occupant restraint system, comprising:
   an accelerometer for producing an accelerometer signal representative of acceleration/deceleration of the vehicle during a vehicle crash;
   long-term integrator means for integrating said accelerometer signal at longer intervals and producing a long-term velocity signal;
   short-term integrator means for integrating said accelerometer signal at shorter intervals and producing a short-term velocity signal;
   bandpass filter means for detecting frequency components of said accelerometer signal which appear uniquely during said vehicle crash;
   squaring means for squaring the amplitude of the bandpass filtered accelerometer signal and producing an impact energy signal; and
   decision means for producing a deployment signal in accordance with said long-term and short-term velocity signals and said impact energy signal and applying said deployment signal to said occupant restraint system.

6. A crash detection apparatus as claimed in claim 5, wherein said decision means comprises:
   first comparator means for comparing said long-term velocity signal with a first threshold value and producing a first deployment signal when said velocity signal exceeds said first threshold value;
   second comparator means for comparing said short-term velocity signal with a second threshold value and producing an output signal when said short-term velocity signal exceeds said second threshold value;
   third comparator means for comparing said impact energy signal with a third threshold value and producing an output signal when said impact energy signal exceeds said third threshold value;
   coincidence detection means for producing a second deployment signal when there is a coincidence between the output signals of said second and third comparator means; and
   means for applying said first and second deployment signals to said restraint system.

7. A crash detection apparatus as claimed in claim 5, further comprising first limiter means for preventing the output signal of said long-term integrator means from reducing below a first predetermined negative level and second limiter means for preventing the output signal of said short-term integrator means from reducing below a second predetermined negative level.

8. A crash detection apparatus as claimed in claim 6, wherein said coincidence detection means includes:
   means for stretching the duration of the output signal of said third comparator means; and
   a coincidence gate for producing said second deployment signal when there is a coincidence between the stretched output signal of the third comparator means and the output signal of said second comparator means.

9. A crash detection apparatus as claimed in claim 5, further comprising:
   first weighting means for weighting said long-term velocity signal to produce a weighted long-term signal and applying the weighted long-term velocity signal to said decision means;
   second weighting means for weighting said short-term velocity signal to produce a weighted short-term velocity signal and applying the weighted short-term velocity signal to said decision means;
   third weighting means for weighting the impact energy signal to produce a weighted impact energy signal and applying the weighted impact energy signal to said decision means; and
   said decision means producing said deployment signal in accordance with the weighted long-term velocity signal, the weighted short-term velocity signal and the weighted impact energy signal.

10. A crash detection apparatus for operating an inflatable occupant restraint system, comprising:
    an accelerometer for producing an accelerometer signal representative of acceleration/deceleration of the vehicle during a vehicle crash;
    lowpass filter means for removing aliasing components of the accelerometer signal;
    sampling means for sampling an output signal of said lowpass filter means at constant intervals to produce analog samples;
    analog-to-digital converter means for converting the analog samples to digital samples;
    integrator means for integrating said digital samples at intervals and producing a velocity signal;
    bandpass filter means for detecting frequency components of said digital samples which appear uniquely during said vehicle crash;
    squaring means for squaring the amplitude of the bandpass filtered digital samples and producing therefrom an impact energy signal;
    first weighting means for weighting said velocity signal to produce a weighted velocity signal;
    second weighting means for weighting the impact energy signal to produce a weighted impact energy signal; and
    decision means for producing a deployment signal in accordance with said weighted velocity signal and said weighted impact energy signal and for applying said deployment signal to said occupant restraint system.

11. A crash detection apparatus as claimed in claim 10, wherein said decision means comprises:
    first comparator means for comparing said weighted velocity signal with a first threshold value and producing a first deployment signal when said weighted velocity signal exceeds said first threshold value;
    adder means for summing said weighted velocity signal and said weighted impact energy signal;
    second comparator means for comparing the output of the adder means with a second threshold value and applying a second deployment signal to said restraint system when said output signal of the adder means exceeds said second threshold value; and third comparator means for comparing said weighted impact energy signal with a third threshold value and applying a third deployment signal to said restraint system when said weighted impact energy signal exceeds said third threshold value.

12. A crash detection apparatus as claimed in claim 11, further comprising limiter means for preventing the integrated digital samples from reducing below a predetermined negative value.

13. A crash detection apparatus for operating an inflatable occupant restraint system, comprising:

an accelerometer for producing an accelerometer signal representative of acceleration/deceleration of the vehicle during a vehicle crash;

lowpass filter means for removing aliasing components of the accelerometer signal;

sampling means for sampling an output signal of said lowpass filter means at constant intervals to produce analog samples;

analog-to-digital converter means for converting the analog samples to digital samples;

long-term integrator means for integrating said analog samples at longer intervals and producing a long-term velocity signal;

short-term integrator means for integrating said analog samples at shorter intervals and producing a short-term velocity signal;

bandpass filter means for detecting frequency components of said digital samples which appear uniquely during said vehicle crash;

squaring means for squaring the amplitude of the bandpass filtered digital samples and producing therefrom an impact energy signal;

first weighting means for weighting said long-term velocity signal to produce a weighted long-term velocity signal;

second weighting means for weighting said short-term velocity signal to produce a weighted short-term velocity signal;

third weighting means for weighting the impact energy signal to produce a weighted impact energy signal; and decision means for producing a deployment signal in accordance with said weighted long-term and weighted short-term velocity signals and said weighted impact energy signal and applying said deployment signal to said occupant restraint system.

14. A crash detection apparatus as claimed in claim 13, wherein said decision means comprises:

first comparator means for comparing said weighted long-term velocity signal with a first threshold value and producing a first deployment signal when said weighted long term velocity signal exceeds said first threshold value;

second comparator means for comparing said weighted short-term velocity signal with a second threshold value and producing an output signal when said weighted short-term velocity signal exceeds said second threshold value;

third comparator means comparing said weighted impact energy signal with a third threshold value and producing an output signal when said weighted impact energy signal exceeds said third threshold value;

coincidence detection means for producing a second deployment signal when there is a coincidence between the output signals of said second and third comparator means; and means for applying said first and second deployment signals to said restraint system.

15. A crash detection apparatus as claimed in claim 13, further comprising first limiter means for preventing said long-term velocity signal of the long-term integrator means from reducing below a first predetermined negative value and second limiter means for preventing said short-term velocity signal of the short-term integrator means from reducing below a second predetermined negative value.

* * * * *

UNITED STATES PATENT AND TRADEMARK OFFICE
CERTIFICATE OF CORRECTION

PATENT NO. : 5,436,838
DATED : July 25, 1995
INVENTOR(S) : Masahiro Miyamori

It is certified that error appears in the above-indentified patent and that said Letters Patent is hereby corrected as shown below:

Column 1, line 24, delete "Is" and insert --is--;

Column 1, line 46, delete "derision" and insert --decision--;

Column 3, line 56, delete "312" and insert --$31_2$--;

Column 3, line 57, delete "--2" and insert -- -2 --;

UNITED STATES PATENT AND TRADEMARK OFFICE
CERTIFICATE OF CORRECTION

PATENT NO. : 5,436,838

DATED : July 25, 1995

INVENTOR(S) : Masahiro Miyamori

It is certified that error appears in the above-indentified patent and that said Letters Patent is hereby corrected as shown below:

Column 3, lines 64 and 65, delete "z--3" and insert --$z_3$--;

Column 5, line 23, delete "445" and insert --46--;

Column 5, line 56, delete "Is" and insert --is--.

Signed and Sealed this

Nineteenth Day of December, 1995

Attest:

BRUCE LEHMAN

*Attesting Officer*  *Commissioner of Patents and Trademarks*